United States Patent [19]
Nilsen et al.

[11] Patent Number: 5,377,216
[45] Date of Patent: Dec. 27, 1994

[54] SEALING METHOD AND ARRANGEMENT FOR TURBINE COMPRESSOR AND LASER EMPLOYING SAME

[75] Inventors: Carl J. Nilsen, Flanders, N.J.; Walter Q. Wilson, Mr. Bethel, Pa.; Kenneth M. Tullio, Bloomfield, N.J.

[73] Assignee: PRC Corporation, Landing, N.J.

[21] Appl. No.: 71,395

[22] Filed: Jun. 4, 1993

[51] Int. Cl.⁵ ............... H01S 3/036; F16J 15/46; F04B 39/04
[52] U.S. Cl. ........................... 372/58; 277/34.3; 277/29; 415/113
[58] Field of Search ............... 372/55, 58, 59; 277/29, 277/34.3, 34.6, 53, 70; 415/111, 113, 230

[56] References Cited

U.S. PATENT DOCUMENTS

| | | | |
|---|---|---|---|
| 2,752,175 | 6/1956 | Fletcher | 277/34.3 |
| 3,338,583 | 8/1967 | Isdale | 277/34.6 |
| 4,068,852 | 1/1978 | Anglade | 277/34.3 |
| 4,135,698 | 1/1979 | Thate et al. | 277/34.3 |
| 4,198,064 | 4/1980 | Huhn | 277/34.6 |
| 4,729,724 | 3/1988 | Henning et al. | 415/113 |
| 4,817,111 | 3/1989 | Nilsen et al. | |
| 5,192,083 | 3/1993 | Jones, Jr. et al. | 277/29 |

FOREIGN PATENT DOCUMENTS 3206369 1/1983 Germany .................. 277/34.6

*Primary Examiner*—Rodney B. Bovernick
*Assistant Examiner*—Robert McNutt
*Attorney, Agent, or Firm*—Antonelli, Terry, Stout & Kraus

[57] ABSTRACT

A turbine-type compressor useful in a gas laser apparatus for flowing gas along a flow path of the laser includes a sealing arrangement about a drive shaft of the compressor for preventing undesirable substances from moving to the compressor impeller along the drive shaft of the compressor and contaminating the laser gas compressed thereby. The sealing arrangement includes a first seal, preferably a vacuum pressure seal, for sealing about the shaft at least during rotation of the shaft, and a second seal comprising a resilient bladder which is selectively expanded and contracted to move into and out of sealing contact with the drive shaft, respectively, for, on one hand, sealing against the shaft when the drive shaft is stationary during pumping down of the laser and, on the other hand, withdrawing the bladder from the shaft when the shaft is rotating. The sealing arrangement is reliable and relatively low cost and uses less gas than a prior art sealing arrangement.

18 Claims, 4 Drawing Sheets

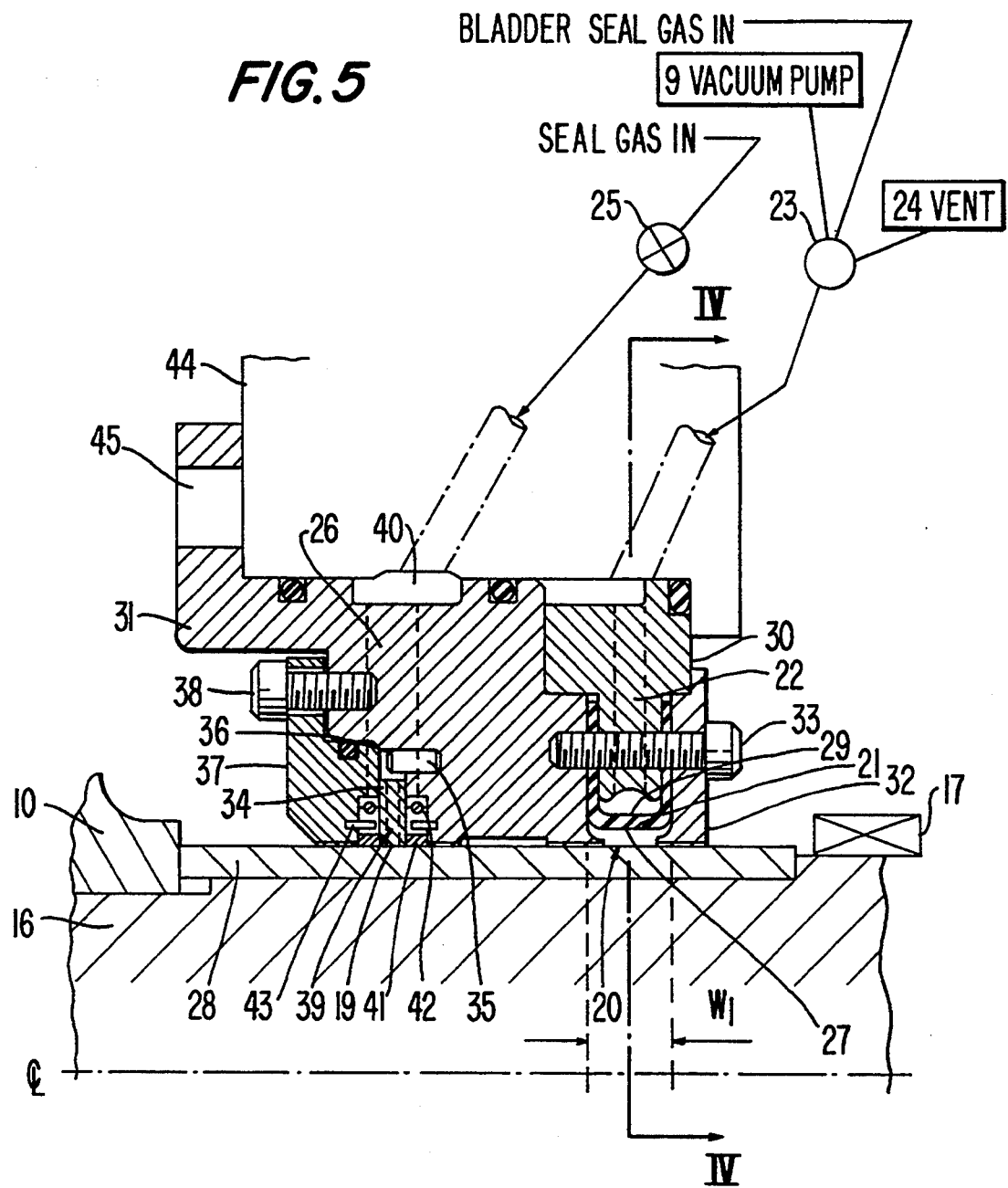

SEALING METHOD AND ARRANGEMENT FOR TURBINE COMPRESSOR AND LASER EMPLOYING SAME

TECHNICAL FIELD

The present invention is directed to a method and a sealing arrangement for preventing undesirable substances from moving to an impeller at a compressor along a drive shaft of the compressor, and to a gas laser apparatus which includes a compressor for flowing laser gas along the flow path of the laser apparatus.

BACKGROUND ART

It is known from assignee's own U.S. Pat. No. 4,817,111 to employ a turbine-type compressor in a fast axial flow gas laser for circulating the laser gas in a closed loop through the laser tube at speeds approaching the speed of sound in the laser gas. The impeller of the turbine-type compressor is rotatably supported on a drive shaft of the compressor. Lubricated bearings rotatably support the drive shaft. To avoid contamination of the laser gas with lubricant from the bearings and atmospheric gas, a fluid seal is provided about the compressor drive shaft between the impeller and the bearings to prevent lubricant and atmospheric gas from moving to the impeller along the drive shaft.

The known sealing arrangement disclosed in U.S. Pat. No. 4,817,111 comprises a tungsten carbide mating ring which is sealingly attached to the drive shaft at a location between the bearings and the impeller for rotation with the shaft. A pair of annular, spaced, stationary carbon members with low friction sliding faces are positioned on respective sides of the mating ring and are yieldably biased against the mating ring by springs. The faces of the mating ring adjacent the stationary carbon members each have a spiral groove formed therein. The grooves extend from a location radially outward of the opposed faces of the stationary members to a location between opposed contacting faces of the ring and members.

When a sealing gas is supplied to the seal, rotation of the compressor drive shaft and mating ring thereon causes the spiral grooves in the ring faces to pump the sealing gas between the ring and stationary members which moves the members away from the ring by a small distance. The sealing gas, which may be the same gas used as the laser gas, is supplied to the fluid seal at a pressure slightly higher than atmospheric pressure so that during rotation of the drive shaft the sealing gas flows through the small gap between the opposed faces of the mating ring and stationary members and along the drive shaft to act as a seal against migration of bearing lubricant and atmospheric gas in the direction of the impeller. Sealing gas moving in the direction of the laser is permitted to enter the laser as make-up gas.

In addition to the aforementioned dynamic seal, this known fluid seal also provides a static seal, e.g. when the compressor shaft is not rotating, such as during pumping down of the gas pressure in the laser. The static seal is achieved by means of the faces of the mating ring closely contacting the opposed faces of the stationary carbon members with these components being sealed by O-rings with the shaft and seal housing, respectively. This known fluid seal, which seals during both dynamic and static conditions of the compressor drive shaft, is relatively costly and can present a problem in reliability under certain conditions such as impure gases and fluid and particles. There is a need for an improved sealing arrangement and method for preventing undesirable substances from moving to the impeller of a compressor along a drive shaft of the compressor which overcome these drawbacks of the prior art.

DISCLOSURE OF THE INVENTION

An object of the present invention is to provide an improved sealing method and arrangement for a compressor for preventing movement of undesirable substances to the impeller of the compressor along a drive shaft thereof, and to provide a laser employing the compressor, wherein the sealing arrangement and method are more reliable and lower in cost as compared with the known method and sealing arrangement.

This and other objects are attained by the compressor of the invention which includes a sealing arrangement about the drive shaft of the compressor for preventing undesirable substances from moving to the impeller along the drive shaft when drive shaft is rotating during operation of the compressor and also when the drive shaft is stationary as during pumping down of the pressure in a laser prior to operation of the compressor and laser. The sealing arrangement includes a first seal for sealing about the drive shaft at least during rotation of the shaft, and a second seal comprising a flexible sealing member, preferably in the form of a resilient bladder, which is selectively moved into and out of sealing contact with the drive shaft for sealing against the drive shaft when the drive shaft is stationary as during pumping down of the laser so as to prevent movement of undesirable substances along the drive shaft.

According to the disclosed, preferred embodiment of the invention, the second seal is spaced from and independent of the first seal. Means are provided for applying pressurized fluid to the flexible sealing member for moving it into sealing contact with the drive shaft. Particularly, the resilient bladder is elastically expanded into sealing contact with the drive shaft by applying a pressurized gas to the bladder. The second seal also preferably includes means for applying a vacuum to the flexible sealing member to ensure that it is moved out of contact with the drive shaft when drive shaft rotation begins.

As a result of this arrangement, the first seal need not form a vacuum tight and helium leak tight seal under static conditions, when the compressor drive shaft is not rotating, as during pumping down of the laser. Rather, the first seal can include a fractured ring seal, a labyrinth seal or other type of leaky seal, the second seal being relied upon to form a leak-tight seal against the shaft when the shaft is stationary during pumping down of the gas pressure in the laser to the desired low vacuum level. In use, after pumping the gas pressure in the laser down to the desired vacuum pressure, rotation of the compressor drive shaft is commenced and the first seal is relied upon to seal about the drive shaft and prevent undesirable substances from moving to the impeller and contaminating the laser gas.

The first seal according to a preferred embodiment of the invention, is a vacuum pressure seal in which a vacuum pressure can be maintained about the drive shaft for sealing against the ingress of lubricant, atmospheric gas and other contaminants to the impeller and laser gas compressed thereby. The compressor/gas laser apparatus further includes a source of vacuum pressure and a fluid passage for connecting the source of vacuum pressure to the first seal.

The vacuum pressure is preferably applied to the first seal during pump down and evacuation of the laser cavity when the bladder of the second seal is inflated. With the use of a leaky first seal, preferably a fractured ring seal, application of the vacuum to the first seal evacuates the first seal and assists in the evacuation of the laser cavity as a result of leakage under the fractured ring into the seal.

The laser cavity continues to be evacuated until the desired cavity vacuum pressure is attained. Then, the turbine compressor is started and simultaneously the bladder is deflated. The laser cavity is then filled with a laser gas until a gas pressure, less than atmospheric pressure but higher than the vacuum pressure at the first seal, is obtained. The vacuum continues to be applied to the first seal, at a lower pressure than the pressure within the laser cavity.

Deflation of the bladder after laser pump down increases the pressure to atmospheric pressure on the compressor motor side of the fractured ring seal between the bladder and the fractured ring. Atmosphere then flows under a fractured ring of the first seal and into the seal where the vacuum pressure is maintained. That is, the atmosphere and other contaminates which leak into the first seal are evacuated by the vacuum pump maintaining the vacuum pressure in the first seal. This gas laser apparatus, compressor and method for preventing undesirable substances from moving to the impeller of a compressor in a gas laser apparatus according to the invention improve the performance of the shaft seal and lower the amount of gas used by the seal as compared with the aforementioned known sealing arrangement in U.S. Pat. No. 4,817,111.

According to another embodiment of the invention, the first seal comprises a fluid seal wherein a sealing gas is introduced at a pressure above atmospheric pressure to prevent undesirable substances from moving to the impeller and the laser gas along the drive shaft.

These and other objects, features and advantages of the present invention will become more apparent from the following description when taken in connection with the accompanying drawings, which show, for purposes of illustration only, two embodiments according to the invention.

BRIEF DESCRIPTION OF THE DRAWINGS

FIG. 5 is a view similar to FIG. 3 of a seal arrangement according to a second embodiment of the invention.

BEST MODE FOR CARRYING OUT THE INVENTION

Figure 1:
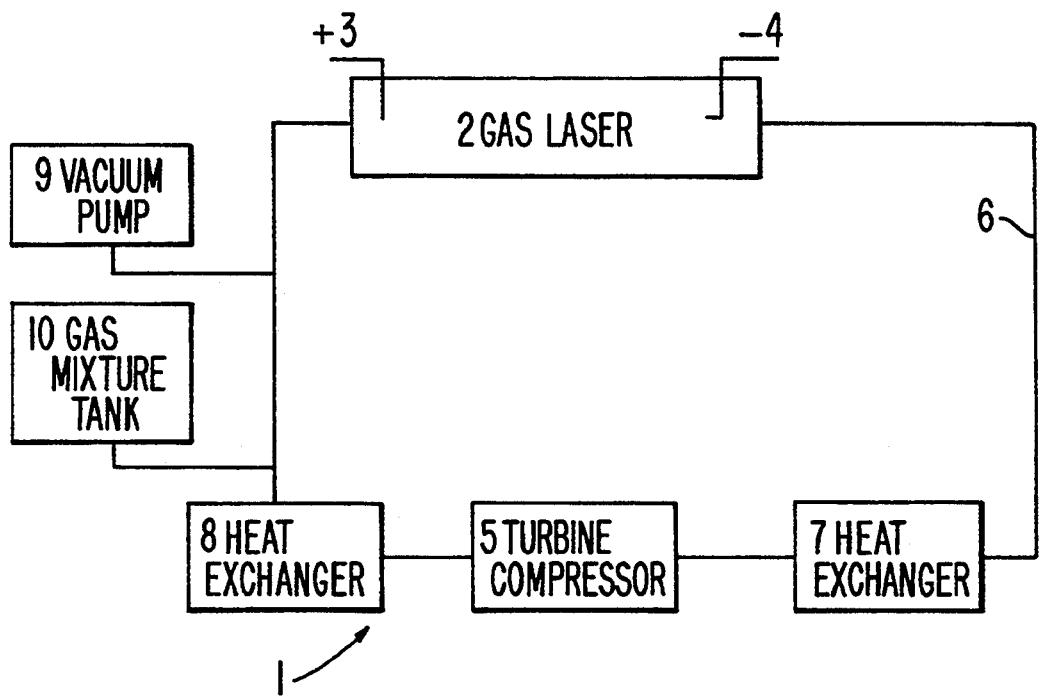
FIG. 1 is schematic illustration of a gas laser apparatus according to a first embodiment of the invention.

Referring now to the drawings, the gas laser 1 according to the invention schematically illustrated in FIG. 1 comprises a laser tube or other structure 2 defining a flow path for the fast axial flow of a laser gas, at least two electrodes 3 and 4 arranged for electrically exciting gas flowing in the apparatus to cause the gas to lase in the laser tube, and a turbine-type compressor 5 for flowing gas through the laser tube.

The compressor 5 is preferably a regenerative compressor of the type disclosed in assignee's U.S. Pat. No. 4,817,111, which compressor is modified to include the improved sealing arrangement 18 of the present invention for sealing along the drive shaft of the compressor. The sealing arrangement 18 is employed in lieu of the prior art fluid seal for the compressor drive shaft as disclosed in U.S. Pat. No. 4,817,111.

The laser gas employed in laser apparatus 1 can be any suitable laser gas. In the disclosed embodiment it is a gas mixture of approximately 80% helium, 20% nitrogen and including a small amount of carbon dioxide gas. The laser tube 2 and compressor 5 form part of an essentially closed loop 6 of the apparatus for recirculating the laser gas through the gas laser tube and the compressor. Heat exchangers 7 and 8 are also provided in the essentially closed loop 6 on respective sides of the turbine compressor for cooling the circulating gas.

A vacuum pump 9 is placed in fluid communication with the closed loop 6 for pumping down the gas pressure in the closed loop 6 in preparation for operation of the compressor and laser and for maintaining the necessary low pressure, for example, a pressure within the range of 50 to 200 Torr, required during the operation of the gas laser. A gas mixture tank 10 is also provided in selective communication with the closed loop 6 for supplying and replacing the laser gas in the loop 6.

Figure 2:
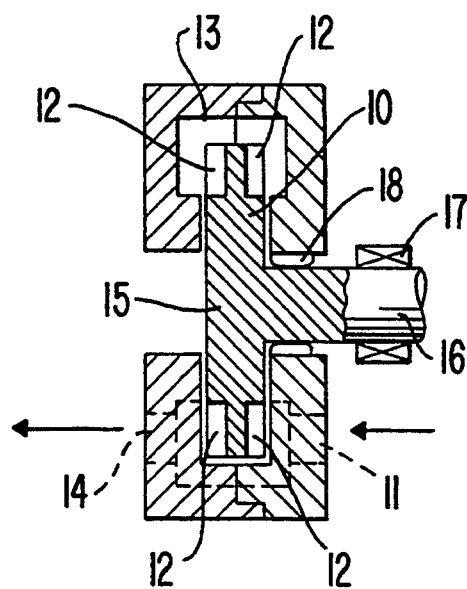
FIG. 2 is a schematic view, partially in cross-section, of the two stage, double-sided regenerative turbine compressor of the laser apparatus of FIG. 1, showing schematically the sealing arrangement about the compressor drive shaft between the impeller and a bearing supporting the drive shaft.

The turbine-type compressor 5, schematically illustrated in FIG. 2, is a two-stage regenerative compressor wherein the first and second stages of the compressor are located on respective sides of a single impeller 10. Gas from heat exchanger 7 enters an annular passage on one side of the impeller through inlet 11 for compression by the blades 12 on the one side of the impeller 10. The compressed gas then passes through a flow channel 13 to the second stage where it is further compressed by blades of the impeller as it flows in an annular passage on a second, opposite side of the impeller after which it is moved through an outlet 14 for circulation through the laser tube 2 by way of the heat exchanger 8.

The impeller 10 is mounted for rotation upon a correspondingly shaped end 15 of a drive shaft 16 of the compressor. The drive shaft 16 is rotatably supported within the compressor by bearings, one of which is shown at 17. The drive shaft is rotated at high speed during operation of the compressor and laser by a motor through a driving connection. The motor and driving connection are not illustrated, but they can be arranged as shown in U.S. Pat. No. 4,817,111.

To avoid contamination of the laser gas by movement of undesirable substances such as atmospheric gas and bearing lubricant along the drive shaft to the impeller, both during pump down when the compressor drive shaft is stationary and also during rotation of the shaft with compressor and laser operation, according to the invention the sealing arrangement 18 is located so as to completely surround the shaft 16 at a location on the shaft intermediate the bearing 17 and impeller 10 as shown schematically in FIG. 2. From the detailed views of FIGS. 3 and 4, it is seen that the sealing arrangement 18 includes a first seal 19 for sealing about the drive shaft in at least the dynamic condition of the shaft. The seal 19 is in the form of a vacuum pressure seal wherein a vacuum pressure is maintained so as to evacuate from the seal gases leaking into the seal whereby atmospheric gas, lubricant or other contaminates can be prevented from reaching the impeller. The vacuum pressure is preferably maintained in the first seal during pump down of the laser cavity as well as during operation of the compressor and laser as discussed below.

The sealing arrangement 18 further includes a second seal 20 for sealing about the drive shaft in the static condition of the shaft as during laser pump down. The seal 20 is spaced axially along the drive shaft 16 from the first seal 19 in the direction of bearing 17. The second seal 20 comprises a flexible sealing member 21 in the form of a resilient bladder which, in its relaxed condition, is spaced radially outward of the shaft so that it does not interfere with rotation of the shaft. The bladder completely surrounds the shaft. It can be selectively moved into and out of sealingly contact with the compressor drive shaft 16. When the bladder contacts the stationary shaft it makes a gas-tight seal against the shaft to prevent movement of undesirable substances along the drive shaft. The seal is preferably made during pumping down of the gas pressure in the laser.

A pressurized bladder seal gas is applied to the radially outer side of the resilient bladder 21 by way of gas passage 22 and valve 23 for expanding the bladder to move it into sealing contact with the drive shaft 16. The bladder seal gas is at a pressure of, for example, 20–25 psi. The valve 23 also permits disconnection of the bladder and passage 22 with the pressurized gas and connection thereof to a vent 24 for releasing the pressurized seal gas to move the resilient bladder from sealing contact with the drive shaft by the elastic contraction of the expanded bladder. The valve 23 can also be adjusted to connect the gas passage 22 and bladder to a vacuum created by the vacuum pump 9 for lowering the pressure inside the bladder to assist withdrawal of the bladder from sealing contact with the drive shaft. The bladder seal gas can be the same gas as the laser gas although the pressures of the two are different.

A vacuum is established and maintained in the first seal 19 by opening valve 25 in gas passage 50 between the first seal and the vacuum pump 9. The vacuum pressure maintained at the first seal 19 is preferably lower than the gas pressure in the laser during laser operation as discussed below.

Figure 3:
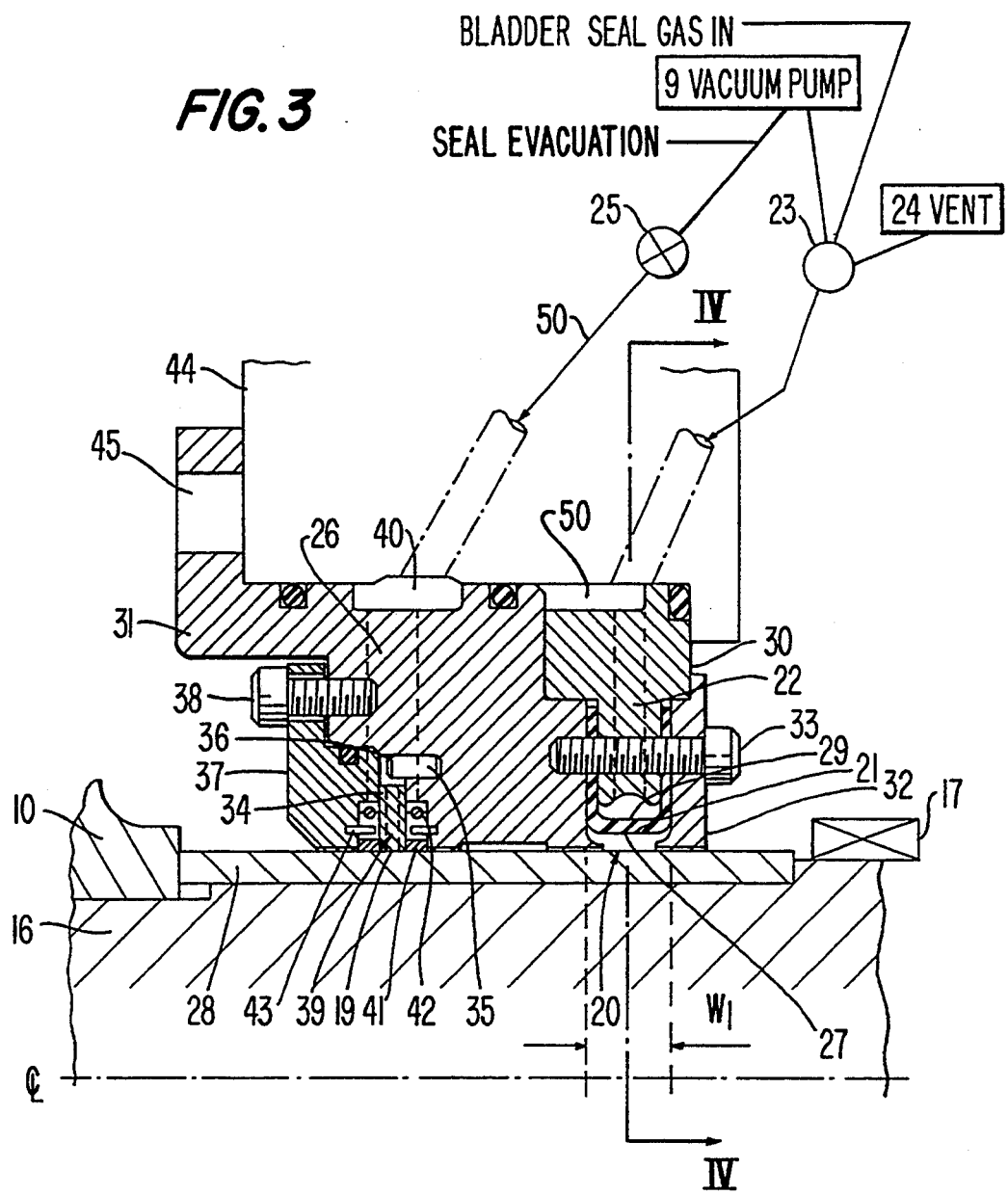
FIG. 3 is an enlarged view, partially in cross-section, taken along the longitudinal central axis CL of the compressor drive shaft showing the seal arrangement about the compressor drive shaft.
Figure 4:
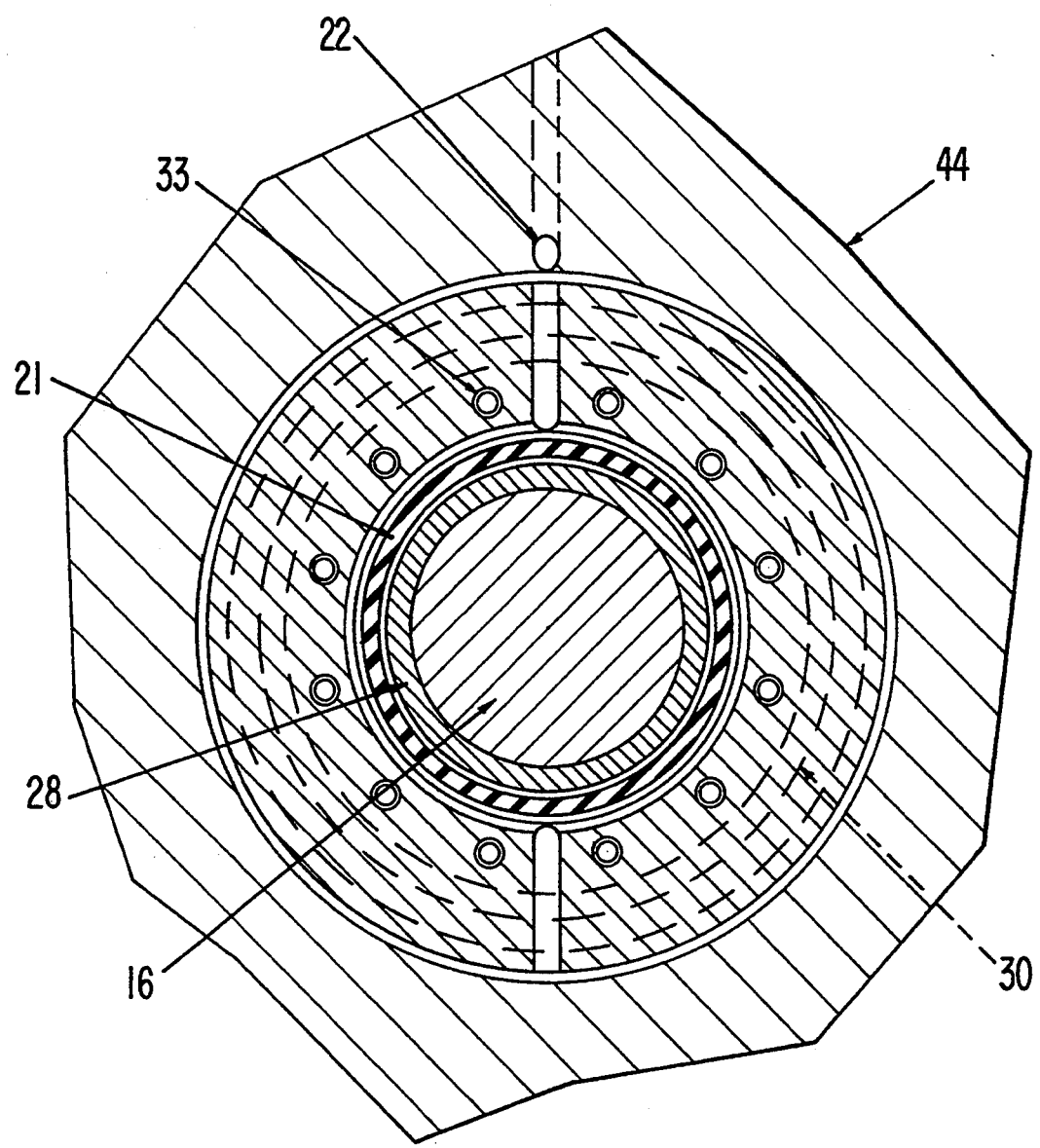
FIG. 4 is a cross-sectional view through the bladder seal of the compressor shaft seal arrangement, taken along the line IV—IV in FIG. 3.

The resilient material of the annular, u-shaped bladder 21 of the second seal 20 is rubber in the disclosed, preferred embodiment. Particularly, the bladder is made of Viton rubber having a hardness of 60 Duro. In its relaxed, non-inflated state, as shown in FIG. 3, the radially inner surface 27 of the bladder is spaced outwardly from the outer circumferential surface of compressor drive shaft 16 which is formed by a hardened sleeve 28 pressed over shaft 16.

The bladder 21 has a width $W_1$ along the axis CL of the shaft of ½ inch. When the bladder is inflated through the application of the pressurized bladder seal gas to the outer surface 29 of the bladder by way of gas passages 22, annular chamber 50 and valve 23, the rubber of the bladder resiliently expands such that the radially inner surface 27 thereof moves into sealing contact with the sleeve 28 of the drive shaft 16 completely around the circumference of the shaft over a length of ¼ inch along axis CL of the shaft to prevent movement of undesirable substances such as atmospheric gas and lubricant along the drive shaft.

This bladder seal is preferably made during pumping down of the gas pressure in the essentially closed loop 6 of the laser with vacuum pump 9, while the compressor shaft is not rotating. The thickness of the rubber of the bladder 21 is 1/16 inch in the disclosed embodiment. If desired, the shaft could be sealed by the seal 20 any time that the shaft is not working.

The legs of the u-shaped bladder 21 are supported on an annular bladder housing 30 of the sealing arrangement. The housing 30, in turn, is retained on a main seal housing 31 by an annular bladder retainer 32 and a plurality of threaded fasteners 33 which extend through aligned apertures in the retainer 32, the bladder, and the bladder housing into threaded openings in main seal housing 31 for sealingly clamping the legs of the u-shaped bladder to permit retention of the pressurized bladder seal gas when it is applied to the outer surface 29 of the bladder. The width of the annular opening for the radially inner surface 27 of the bladder to contact the shaft, as defined between bladder retainer 32 and main seal housing 31, is ¼ inch in the illustrated embodiment as noted above.

In preparation for start of operation of the laser, the vacuum pump 9 is operated to pump down the gas pressure in the laser. At that time the bladder seal gas is applied to the bladder by operation of the valve 23 to expand the bladder into sealing contact with the drive shaft as discussed above. A vacuum pressure is also maintained at first seal 19 during pump down as described below. After the desired low pressure, illustratively less than 8 Torr, is achieved in the laser cavity, the turbine compressor 5 is started. The bladder is retracted by operation of the valve 23 to vent the pressurized gas acting on the bladder 21 upon start of rotation of the compressor shaft. These operations can be performed manually or automatically through an electronic controller such as a suitably programmed microprocessor.

The first seal 19 in the illustrated embodiment includes two fractured ring seals 41 which are designed with a clearance or gap between the seal and the outer surface of the drive shaft. The clearance exists both when the shaft is rotating and when it is stationary, and it permits gas to flow into the seal from both directions along the drive shaft in response to a vacuum which is maintained in the seal during pump down and operation of the laser. A 0.0002 inch clearance between the shaft and each of the ring seals 41 is used in seal 19 in the illustrated embodiment.

The first seal 19 further comprises an annular metal diaphragm 34 formed of aluminum which is held stationary in the main seal housing 31 about the drive shaft 16 by means of a plurality of dowel pins 35 received in apertures in the housing 31 and extending into openings 36 in the diaphragm 34. A cover plate 37 axially presses the metal diaphragm 34 in position against the main seal housing 31 by means of threaded fasteners 38 connecting the cover plate and the main seal housing. The metal diaphragm 34 has a plurality of radially extending apertures 39 extending therethrough for conveying the vacuum pressure to the seal from the vacuum pump 9 by way of gas passage 26 with valve 25. That is, the seal 19 is evacuated by the vacuum pump 9 by way of a fluid passage between the seal and the vacuum pump formed by the apertures 39, an annular chamber 40 communicating with the apertures 39, by way of a plurality of gas inlet passages 26 formed in the main seal housing, and fluid passage 50 with valve 25 therein between the pump and chamber 40.

The radially inner end of the diaphragm 34 adjacent the outer surface of the drive shaft is also positioned with clearance above the drive shaft. The diaphragm is located in the center of the seal between the respective fractured ring seals 41, 41 to allow a vacuum to be maintained about the shaft as a result of continuous evacuation by vacuum pump 9 through the apertures 39.

The fractured ring seals 41 located on each side of the annular metal diaphragm 34 are each formed of two segments of carbon graphite material which together surround the drive shaft with the aforementioned slight clearance. An extension spring 42 of Inconel 600 is wrapped about each graphite ring. The rings are kept from rotating with the drive shaft by dowel pins 43 that extend between the seal rings and the adjacent cover plate 37 and main seal housing 31. The main seal housing 31, cover plate 37, bladder housing 30 and bladder retainer 32 of the second seal 20 are each preferably formed of aluminum. The assembly of these and the other components of the seal 20 are mounted on the turbine housing 34 by threaded fasteners, not shown, which extend through apertures 45 in the main seal housing into threaded openings in the turbine housing 44.

The vacuum pressure is preferably applied to the first seal during pump down and evacuation of the laser cavity when the bladder of the second seal is inflated. With the use of a leaky first seal, preferably the fractured ring seal, application of the vacuum to the first seal evacuates the first seal and assists in the evacuation of the laser cavity as a result of leakage of gas from the laser under the fractured ring into the seal.

The laser cavity continues to be evacuated until the desired cavity vacuum pressure is attained. Then, the turbine compressor is started and simultaneously the bladder is deflated. The laser cavity is then filled with a laser gas until a gas pressure, less than atmospheric pressure but higher than the vacuum pressure at the first seal, is obtained. The vacuum continues to be applied to the first seal during laser operation, at a lower pressure than the pressure within the laser cavity. While a common vacuum pump is used for laser evacuation and seal evacuation in the disclosed embodiment, separate vacuum sources could also be used.

Deflation of the bladder after laser pump down increases the pressure to atmospheric pressure on the compressor motor side of the fractured ring seal between the bladder and the fractured ring. Atmosphere then flows under a fractured ring of the first seal and into the seal where it is evacuated to prevent it from flowing onward to the impeller and contaminating the laser gas. The gas laser apparatus, compressor and method for preventing undesirable substances from moving to the impeller of a compressor in a gas laser apparatus according to the invention improve the performance of the shaft seal and lower the amount of gas used by the seal as compared with the aforementioned known sealing arrangement in U.S. Pat. No. 4,817,111.

Illustratively, when the laser cavity has been evacuated during pump down to a vacuum pressure of 8 Torr, the turbine compressor is started and simultaneously the bladder seal is deflated. Vacuum pressure to the fractured ring seal is maintained at the 8 Torr level during laser operation by continuous evacuation of the fractured ring seal. On the motor side of the fractured ring seal between the bladder and the fractured ring, the pressure increases to atmospheric when the bladder is deflated. Atmosphere then flows under the first fractured ring and into the center of the seal where the pressure is 8 Torr and from where it is evacuated and exhausted through the vacuum pump. Meanwhile, at the start of the shaft rotation, the laser cavity begins to fill with laser gas mixture until a pressure of 85 Torr is obtained. Because the laser cavity is now operating at a higher pressure than the 8 Torr at the center of the fractured ring seal beneath annular metal diaphragm 34, a small amount of laser gas mixture flows through the fractured ring and is evacuated with the atmospheric contaminants.

A second embodiment of the invention is shown in FIG. 5. It is like the first embodiment except that instead of employing a vacuum pressure seal as the first seal 19, the first seal is connected by way of fluid conduit 50 with a source of pressurized gas, e.g. laser gas at a pressure 1 psi higher than atmospheric pressure, to provide a positive pressure fluid seal about the drive shaft. Since the fractured rings of the first seal do not seal tightly about the drive shaft, the seal gas will migrate along the drive shaft and into the laser. Accordingly, the pressurized seal gas must be chosen to be same as or compatible with the laser gas. Thus, the first seal acts as a means for not only sealing against movement of undesirable substances to the impeller and laser gas but also for replenishing the laser gas during operation of the laser. The pressurized seal gas is preferably not supplied to the first seal during pump down and evacuation of the laser cavity for minimizing the time required for pump down. However, the pressurized seal gas is provided to the first seal simultaneously with or prior to deflation of the bladder to prevent ingress of contaminants along the drive shaft at commencement of operation of the compressor.

While we have shown and described only one embodiment in accordance with the invention, it is understood that the same is not limited thereto, but is susceptible of numerous changes and modifications as known to those skilled in the art.

Therefore, we do not wish to be limited to the details shown and described herein, but intend to cover all such changes and modifications as are encompassed by the scope of the appended claims.

We claim:

1. A gas laser apparatus comprising means defining a flow path for a laser gas, means for exciting gas flowing along said flow path in said apparatus to cause said gas to lase, and a compressor for flowing gas along said flow path, said compressor comprising a drive shaft which is rotatable about an axis, an impeller mounted on said drive shaft for rotation with the shaft, said impeller having a plurality of blades thereon for compressing gas to flow it along said flow path, and a sealing arrangement about said drive shaft for preventing undesirable substances from moving to said impeller along said drive shaft during rotation of the drive shaft when the laser is operating and when the drive shaft is stationary as during pumping down of the pressure in the laser prior to laser operation, said sealing arrangement including a first seal for sealing about the drive shaft at least during rotation of the shaft, and a second seal comprising a flexible sealing member which can be selectively moved into and out of sealing contact with the drive shaft for sealing against the drive shaft when the drive shaft is stationary to prevent movement of undesirable substances along the drive shaft, wherein said first seal is a vacuum pressure seal in which a vacuum can be maintained about said drive shaft for preventing undesirable substances from moving to said impeller along said drive shaft, said apparatus further comprising a source of vacuum pressure and a fluid passage connecting said source of vacuum pressure to said first seal.

2. A gas laser apparatus according to claim 1, wherein said second seal includes means for applying pressurized fluid to said flexible sealing member for moving it into sealing contact with said drive shaft.

3. A gas laser apparatus according to claim 2, wherein said flexible sealing member is in the form of a resilient bladder which is elastically expanded into sealing contact with the drive shaft under the application of pressurized fluid to said bladder.

4. A gas laser apparatus according to claim 1, further comprising a bearing supporting said drive shaft for rotation at a location along said drive shaft spaced from said impeller, said sealing arrangement being located along said drive shaft intermediate said bearing and said impeller.

5. A gas laser apparatus according to claim 4, wherein said second seal is located along said drive shaft between said bearing and said first seal.

6. A gas laser apparatus according to claim 1, wherein said vacuum is lower than an operating pressure of the laser gas in said gas laser apparatus.

7. A gas laser apparatus according to claim 1, wherein said second seal includes means for applying a vacuum to said flexible sealing member for moving it out of contact with said drive shaft when said drive shaft begins rotation.

8. A compressor comprising a drive shaft which is rotatable about an axis, an impeller mounted on said drive shaft for rotation with the shaft, said impeller having a plurality of blades thereon for compressing gas, and a sealing arrangement about said drive shaft for preventing undesirable substances from moving to said impeller along said drive shaft during rotation of the drive shaft and when the drive shaft is stationary, said sealing arrangement including a first seal for preventing undesirable substances from moving to said impeller along said drive shaft during rotation of the shaft, and a second seal comprising a flexible sealing member which can be selectively moved into and out of sealing contact with the drive shaft for sealing against the drive shaft when the drive shaft is stationary to prevent undesirable substances from moving to said impeller along said drive shaft, wherein said first seal is a vacuum pressure seal in which a vacuum can be maintained about said drive shaft for preventing undesirable substances from moving to said impeller along said drive shaft, said apparatus further comprising a source of vacuum pressure and a fluid passage connecting said source of vacuum pressure to said first seal.

9. A compressor according to claim 8, wherein said second seal includes means for applying pressurized fluid to said flexible sealing member for moving it into sealing contact with said drive shaft.

10. A compressor according to claim 9, wherein said flexible sealing member is in the form of a resilient bladder which is elastically expanded into sealing contact with the drive shaft under the application of pressurized fluid to said bladder.

11. A compressor according to claim 8, further comprising a bearing supporting said drive shaft for rotation at a location along said drive shaft spaced from said impeller, said sealing arrangement being located along said drive shaft intermediate said bearing and said impeller.

12. A compressor according to claim 11, wherein said second seal is located along said drive shaft between said bearing and said first seal.

13. A compressor according to claim 8, wherein said second seal includes means for applying a vacuum to said flexible sealing member for moving said sealing member out of contact with said drive shaft when said drive shaft rotation begins.

14. A method for preventing undesirable substances from moving to the impeller of a compressor in a gas laser apparatus along a drive shaft of the compressor wherein said impeller has a plurality of blades thereon for compressing the laser gas to flow it along a flow path of the gas laser apparatus, said method comprising applying fluid pressure to a flexible sealing member about the drive shaft to move the flexible sealing member into sealing contact with the drive shaft of the compressor when the shaft is stationary, pumping down the gas pressure in said flow path to a desired vacuum pressure, said flexible sealing member in sealing contact with the drive shaft preventing undesirable substances from moving along said drive shaft toward the impeller during said pumping down, and moving the flexible sealing member out of sealing contact with the drive shaft for operation of the compressor and laser, and wherein said method includes providing a vacuum pressure seal about said drive shaft at least during rotation of the drive shaft for preventing undesirable substances from moving to said impeller along said drive shaft.

15. The method according to claim 14, wherein said flexible sealing member is in the form of a bladder formed of a resilient material, the application of said fluid pressure elastically expanding the bladder into sealing contact with the drive shaft.

16. The method according to claim 14, wherein said step of moving the flexible sealing member out of sealing contact with the drive shaft includes applying a vacuum pressure to said flexible member.

17. The method according to claim 14, wherein said vacuum pressure seal is located between the flexible sealing member and the impeller and is also provided during said pumping down to assist in the lowering of the pressure in said flow path to the desired vacuum pressure.

18. The method according to claim 14, wherein a vacuum pressure is maintained in said vacuum pressure seal that is lower than an operating gas pressure in said laser.

* * * * *